United States Patent
Seo et al.

(10) Patent No.: US 11,727,862 B2
(45) Date of Patent: Aug. 15, 2023

(54) MODULAR DISPLAY APPARATUS AND CONTROL METHOD THEREOF

(71) Applicant: SAMSUNG ELECTRONICS CO., LTD., Suwon-si (KR)

(72) Inventors: Jeongryeol Seo, Suwon-si (KR); Sangwon Kim, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/508,373

(22) Filed: Oct. 22, 2021

(65) Prior Publication Data
US 2022/0044625 A1 Feb. 10, 2022

Related U.S. Application Data

(63) Continuation of application No. 16/834,514, filed on Mar. 30, 2020, now Pat. No. 11,158,243.

(30) Foreign Application Priority Data

Apr. 15, 2019 (KR) .......................... 10-2019-0043689

(51) Int. Cl.
G09G 3/30 (2006.01)
G09G 3/36 (2006.01)
G09G 3/32 (2016.01)

(52) U.S. Cl.
CPC .......... *G09G 3/32* (2013.01); *G09G 2300/026* (2013.01); *G09G 2360/04* (2013.01); *G09G 2370/06* (2013.01); *G09G 2370/16* (2013.01)

(58) Field of Classification Search
CPC .......... G09G 2300/02–026; G09G 3/32; G09G 2360/04; G09G 2370/16
See application file for complete search history.

(56) References Cited

U.S. PATENT DOCUMENTS 6,285,343 B1 9/2001 Brody
2005/0168399 A1 8/2005 Palmquist
(Continued)

FOREIGN PATENT DOCUMENTS

JP 2009-244346 A 10/2009
JP 5052211 B2 10/2012
(Continued)

OTHER PUBLICATIONS

International Search Report (PCT/ISA/210) dated Jul. 13, 2020 issued by the International Searching Authority in International Application No. PCT/KR2020/004711.
(Continued)

*Primary Examiner* — Sanghyuk Park
(74) *Attorney, Agent, or Firm* — Sughrue Mion, PLLC

(57) ABSTRACT

A display apparatus of a plurality of display apparatuses constituting a wall display includes a first board, a second board, and a plurality of display modules. The first board includes a first communication interface including a circuitry for wireless transmission, and a timing controller configured to, in response to information on an image being received, generate a plurality of driving signals for driving the plurality of display modules based on the received information and transmit the plurality of driving signals to the second board through the first communication interface. The second board includes a second communication interface including circuitry for wireless reception, a plurality of interfaces electrically connected to the plurality of display modules, and an IC chip configured to, based on the plurality of driving signals being received through the second interface, provide each of the received driving signals to each of the display modules.

10 Claims, 10 Drawing Sheets

(56) References Cited

U.S. PATENT DOCUMENTS

| | | |
|---|---|---|
| 2006/0209884 A1 | 9/2006 | MacMullan et al. |
| 2009/0015513 A1 | 1/2009 | Kim et al. |
| 2009/0128524 A1 | 5/2009 | Young et al. |
| 2009/0244001 A1 | 10/2009 | Nakai et al. |
| 2010/0289872 A1 | 11/2010 | Funabiki et al. |
| 2011/0109792 A1 | 5/2011 | Montag |
| 2011/0296055 A1 | 12/2011 | Kim et al. |
| 2014/0204104 A1 | 7/2014 | Jang et al. |
| 2015/0186098 A1 | 7/2015 | Hall |
| 2015/0189218 A1 | 7/2015 | Kim et al. |
| 2016/0133224 A1 | 5/2016 | Nakajima |
| 2016/0180812 A1 | 6/2016 | Choi et al. |
| 2016/0266859 A1 | 9/2016 | Akatsuka et al. |
| 2016/0309170 A1 | 10/2016 | Ernst et al. |
| 2017/0186365 A1 | 6/2017 | Yoneda |
| 2017/0220310 A1* | 8/2017 | Hochman .......... H01R 13/6205 |
| 2018/0011677 A1 | 1/2018 | Lee |
| 2018/0060014 A1* | 3/2018 | Son ....................... G06F 3/1431 |
| 2018/0192042 A1 | 7/2018 | Stolzberg |
| 2018/0226843 A1 | 8/2018 | Ha et al. |
| 2018/0314483 A1 | 11/2018 | Liu |
| 2019/0005906 A1* | 1/2019 | Chen ................... G09G 3/3648 |
| 2019/0005924 A1 | 1/2019 | Saeed et al. |
| 2019/0251651 A1 | 8/2019 | Chang et al. |
| 2019/0296579 A1 | 9/2019 | Akatsuka et al. |
| 2019/0304048 A1* | 10/2019 | Hu ............................ G06T 9/00 |
| 2020/0042275 A1* | 2/2020 | Yueh ....................... G06F 3/147 |
| 2020/0241828 A1 | 7/2020 | Noyelle et al. |

FOREIGN PATENT DOCUMENTS

| | | |
|---|---|---|
| JP | 5641795 B2 | 12/2014 |
| JP | 2016-9075 A | 1/2016 |
| KR | 10-0172330 B1 | 3/1999 |
| KR | 10-0876963 B1 | 1/2009 |
| KR | 10-2017-0118279 A | 10/2017 |
| KR | 10-2017-0124745 A | 11/2017 |
| KR | 10-2018-0032738 A | 4/2018 |
| KR | 10-1870136 B1 | 6/2018 |
| KR | 10-2018-0092391 A | 8/2018 |

OTHER PUBLICATIONS

Written Opinion (PCT/ISA/237) dated Jul. 13, 2020 issued by the International Searching Authority in International Application No. PCT/KR2020/004711.
Communication dated May 28, 2020, from the European Patent Office in European Application No. 20165778.0.
Communication dated Sep. 1, 2020, issued by the European Patent Office in counterpart European Application No. 20165778.0.
Notice of Allowance issued in parent U.S. Appl. No. 16/834,514 dated Jun. 23, 2021.
Final Office Action issued in parent U.S. Appl. No. 16/834,514 dated Apr. 15, 2021.
Office Action issued in parent U.S. Appl. No. 16/834,514 dated Oct. 29, 2020.
Communication dated Sep. 28, 2021 issued by the European Intellectual Property Office in counterpart European Application No. 20 165 778.0.
Communication dated Mar. 10, 2022 issued by Intellectual Property India in Indian Application No. 202117047541.
Communication dated Oct. 27, 2022 issued by the European Patent Office in European Patent Application No. 22185833.5.
Summons to Attend Oral Proceedings issued Jun. 1, 2023 by the European Patent Office in European Patent Application No. 20165778.0.

* cited by examiner

| 100-1 | 100-2 | 100-3 | 100-4 |
| 100-5 | 100-6 | 100-7 | 100-8 |
| 100-9 | 100-10 | 100-11 | 100-12 |
| 100-13 | 100-14 | 100-15 | 100-16 |

MODULAR DISPLAY APPARATUS AND CONTROL METHOD THEREOF

CROSS-REFERENCE TO RELATED APPLICATIONS

This application is a continuation of U.S. application Ser. No. 16/834,514 filed on Mar. 30, 2020, which claims priority from Korean Patent Application No. 10-2019-0043689, filed on Apr. 15, 2019, in the Korean Intellectual Property Office, the disclosures of which are herein incorporated by reference in their entirety.

BACKGROUND

1. Field

The disclosure relates to a display apparatus constituting a wall display and a control method thereof, and more particularly to a display apparatus that wirelessly transmits and receives information related to an image and a control method thereof.

2. Description of the Related Art

With the development of electronics technologies, various types of electronic apparatuses have been developed. Particularly, a modular display apparatus connecting a plurality of display modules has been developed.

The modular display apparatus displays a high-resolution image on a large screen collectively leveraging the plurality of display modules to display a unified image, thereby providing visual satisfaction to users.

Each display module of the modular display apparatus is generally connected to a timing controller board for generating a LED drive signal.

In that configuration, there may be many restrictions on the use of the modular display apparatus. For example, when the timing controller board or the display module are required to be replaced while the modular display apparatus is installed as a wall-mounted display device, a number of cables between the timing controller board and the display module should be dismantled to separate the display module of the modular display apparatus from the timing controller board.

SUMMARY

According to an embodiment of the disclosure, there is provided a display apparatus of among a plurality of display apparatuses constituting a wall display includes a first board, a second board, and a plurality of display modules, wherein the first board includes a first wireless communication interface, and a timing controller configured to generate a plurality of driving signals for driving the plurality of display modules based on an image to be displayed by the plurality of display apparatuses and control the first wireless communication interface to transmit the plurality of driving signals to the second board, and wherein the second board includes a second wireless communication interface, a plurality of interfaces electrically connected to the plurality of display modules, and an IC chip configured to, based on the plurality of driving signals received through the second wireless communication interface, respectively provide a driving signal among the plurality of driving signals to each display module of the plurality of display modules.

According to an embodiment of the disclosure, there is provided a method of controlling a display apparatus among a plurality of display apparatuses constituting a wall display, the method including receiving an image to be displayed by the plurality of display apparatuses through a first board of the display apparatus, generating a plurality of driving signals for driving a plurality of display modules included in the display apparatus based on the image, and wirelessly transmitting the plurality of driving signals from the first board to a second board of the display apparatus, and based on the plurality of driving signals transmitted to the second board, providing a driving signal among the plurality of driving signals to each display module of the plurality of display modules electrically connected to the second board.

BRIEF DESCRIPTION OF THE DRAWINGS

The above and/or other aspects of the inventive concept will be more apparent by describing certain exemplary embodiments of the inventive concept with reference to the accompanying drawings, in which:

FIG. 1C is a view illustrating a modular display apparatus, in which a display apparatus is combined, according to an embodiment;

DETAILED DESCRIPTION OF EXEMPLARY EMBODIMENTS

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the specification, and may also be construed based on general contents of the specification and a typical technical concept in the art unless the terms are not specifically defined.

In describing example embodiments, detailed description of relevant known functions or components may be omitted if such description would obscure the description of the embodiment.

Hereinafter, the disclosure will be described in detail with reference to the accompanying drawings, but it is not limited thereto.

Hereinafter, certain exemplary embodiments will now be explained in detail with reference to the accompanying drawings.

An object of the disclosure is to dispose a module bridge board capable of wireless communication between a timing controller board and a display module, and to provide a modular display device having no electrical connection between the timing controller board and the display module.

Figure 1A:
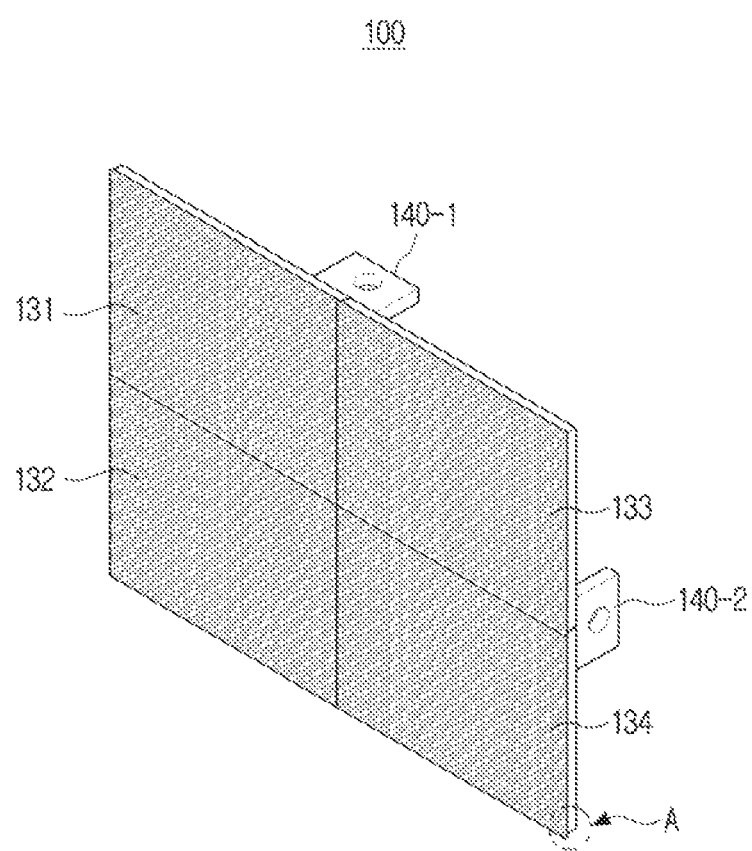
FIG. 1A is a view illustrating a configuration of a display apparatus according to an embodiment.
Figure 1B:
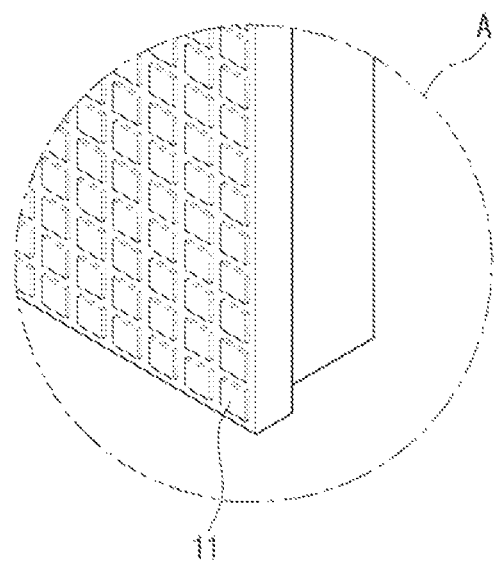
FIG. 1B is a view illustrating a pixel of the display apparatus according to an embodiment.

FIGS. 1A, 1B, and 1C are views illustrating a display apparatus according to an embodiment.

The display apparatus 100 according to an embodiment may include a plurality of display modules.

For example, referring to FIG. 1A, a display apparatus 100 according to an embodiment of the disclosure may include four display modules 131, 132, 133, and 134. Each of display modules 131 to 134 may be physically connected together.

Each of the display modules 131 to 134 may be implemented as an LED display module including an inorganic light emitting diode (LED).

Specifically, referring to FIG. 1B, each of the display modules 131 to 134 may be implemented as an LED display module including a plurality of LEDs 11 that implements a red LED, a green LED, and a blue LED, which are sub pixels of the display modules 131 to 134.

The plurality of pixels may be arranged in a matrix form (e.g., M×N, where M and N are natural numbers). Specifically, the matrix may be in the form of an identical array (e.g., M=N, where M and N are natural numbers, a 16×16 array, a 24×24 array, etc.), as well as other arrays (e.g., M≠N, where M and N are natural numbers).

The LEDs of the LED display module according to an embodiment of the disclosure may be implemented as a micro LED. A size of the micro LED is about 5 to 100 micrometers, and thus a micro light emitting device emits light without a color filter.

As such, because the LED display module is composed of micro LEDs, the modular display apparatus 1000 according to an embodiment of the disclosure may be implemented without a bezel, and may display a seamless image without displaying any gaps between the display apparatuses when displaying an image.

However, such LED display module is only an embodiment, and the LED display module may be implemented as a flat display panel such as a liquid crystal panel (LCD), an organic LED (OLED), an active-matrix OLE (AMOLED) panel, a plasma display panel (PDP), or the like. Hereinafter, for convenience of description, the display module according to an embodiment of the disclosure will be described as an LED display module.

Referring back to FIG. 1A, the display apparatus 100 according to an embodiment of the disclosure may be implemented by combining the plurality of display modules 131 to 134 in a 2×2 array.

The LED display module in the 2×2 array is merely an embodiment, and the arrangement form and number of the LED display module may be variously changed.

The display apparatus 100 may include a base plate on which each of the display modules 131 to 134 may be mounted. The base plate may be implemented in a form that each display module can be mounted on the front of the base plate.

The display device 100 according to an embodiment may include a plurality of connecting parts 140-1 and 140-2 that can be coupled to other display apparatuses. Meanwhile, positions and the number of the connecting parts in FIG. 1A are only an embodiment, the positions and number of the connecting parts may be variously changed.

Accordingly, the display apparatus 100 according to an embodiment of the disclosure may be implemented as a modular display apparatus by combining with other display apparatuses. The modular display apparatus may be referred to as a wall display or a video wall.

For example, referring to FIG. 1C, a plurality of display apparatuses 100-1, 100-2, 100-3, 100-4, 100-5, 100-6, 100-7, 100-8, 100-9, 100-10, 100-11, 100-12, 100-13, 100-14, 100-15, and 100-16 are coupled to each other in a 4×4 array, and may be implemented as a modular display apparatus 1000 such as a video wall. Meanwhile, the modular display apparatus in the 4×4 array is merely an embodiment, and the arrangement and number of display apparatuses may be variously changed.

The modular display apparatus 1000 may display an image through a display module included in each of the plurality of display apparatuses. The image may be an image received from an electronic apparatus (e.g., a set-top box), or may be an image stored in the modular display apparatus.

Figure 1D:
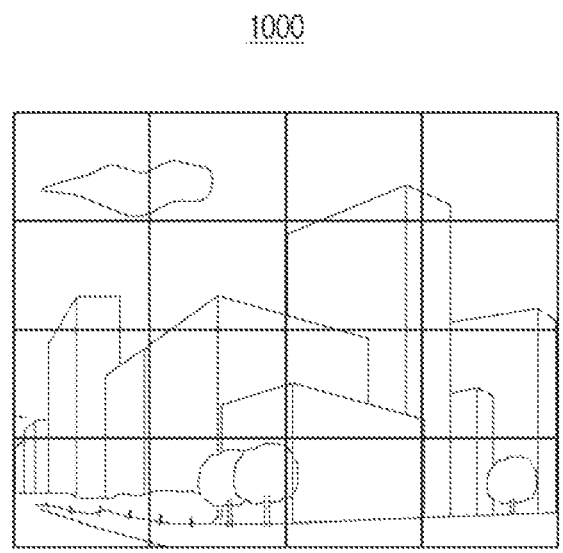
FIG. 1D is a view illustrating a modular display apparatus for displaying an image according to an embodiment.

For example, as illustrated in FIG. 1D, the modular display apparatus 1000 according to an embodiment may display a unified image through a plurality of display apparatuses. A detailed description of an image display method of the modular display apparatus 1000 will be described below.

As described above, the display apparatus 100 of the disclosure may be referred to as a cabinet as any one of the plurality of display apparatuses 100 constituting the modular display apparatuses 1000.

Figure 2:
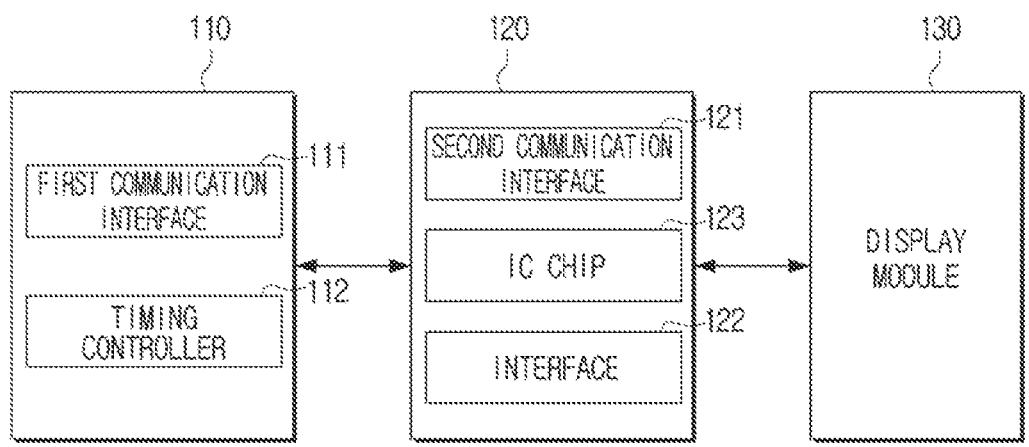
FIG. 2 is a block diagram illustrating a configuration of a display apparatus according to an embodiment.

FIG. 2 is a block diagram illustrating a display apparatus according to an embodiment.

Referring to FIG. 2, a display apparatus 100 according to an embodiment of the disclosure includes a first board 110, a second board 120, and a display module 130. The display module 130 may be implemented as a plurality of display modules. The display apparatus 100 may be any one of the plurality of display apparatuses constituting the modular display apparatus 1000. As illustrated in FIG. 2, the first board 110 may include a first communication interface 111 and a timing controller 112, and the second board 120 may include a second communication interface 121, an interface 122, and an IC chip 123.

The first board 110 may receive information about an image. For example, the timing controller 112 of the first board 110 may receive information regarding an image from an electronic apparatus (e.g., a set-top box). For this operation, the first board 110 may be connected to the electronic apparatus. For example, the first board 110 may be connected to the electronic apparatus through an optical cable or an electrical cable and receive information regarding an image transmitted by the electronic apparatus through the optical cable or the electrical cable.

Meanwhile, the timing controller of the first board 110 may receive information about an image from a control box. The control box is an electronic device connected to an electronic device (e.g., a set top box), and the first board 110 may receive information about the image transmitted by the electronic apparatus to the control box.

For this operation, the first board 110 may be connected to the control box. For example, the first board 110 may be connected to the control box through an optical cable and receive information regarding the image transmitted by the control box through the optical cable.

Although the control box is described as a separate electronic apparatus distinguished from the modular display apparatus 1000, the control box may be an apparatus mounted on the modular display apparatus 1000. Alternatively, the modular display apparatus 1000 may be understood as including the control box.

When information regarding the image described above is received, the timing controller 112 of the first board 110 may generate a plurality of driving signals for driving the plurality of display modules 130 included in the display apparatus 100 based on the received information.

For this operation, when the information regarding the image is received, the timing controller 112 may identify an area corresponding to identification information of the display apparatus 100 among the entire areas of the image, based on the identification information of the display apparatus 100. The identification information of the display apparatus 100 may be pre-stored by each display apparatus. For example, when the identification information of the display apparatus is ID 1, the timing controller 112 may identify an area corresponding to ID 1 of all areas of the image.

The timing controller 112 may receive the identification information of the display apparatus 100 together with the information about the image from the control box, and based on the identification information received from the control box, may identify an area corresponding to the identification information of the display apparatus 100 among the entire area of the image. For example, if the identification information received from the control box is ID 1, the timing controller 112 may identify the area corresponding to ID 1 of the entire area of the image.

In addition, the timing controller 112 may generate a plurality of driving signals for driving the plurality of pixels included in the display module to display the image corresponding to the identified area through the plurality of display modules included in the display apparatus 100.

For this operation, the timing controller 112 may identify information about the image of the area corresponding to the identification information of the display apparatus 100 among the information about the received image. In addition, the timing controller 112 may generate a plurality of driving signals for driving the plurality of display modules included in the display apparatus 100 based on the information about the image of the identified area.

For example, the timing controller 112 may generate a plurality of driving signals for driving a red LED, a green LED, and a blue LED included in each display module based on the information about the image of the identified area.

The timing controller 112 may transmit the plurality of driving signals to the second board 120 through the first communication interface 111. For example, the timing controller 112 may wirelessly transmit the plurality of driving signals to the second board 120 through the first communication interface 111. For this operation, the first communication interface 111 may include at least one of a Wi-Fi chip, a Bluetooth chip, or a wireless communication chip. However, this is only an example, and the first communication interface 111 may include various hardware capable of wirelessly transmitting a signal such as a wireless transmission antenna, etc.

The second board 120 may receive a plurality of driving signals through the second communication interface 121. For example, the IC chip 123 of the second board 120 may wirelessly receive the plurality of driving signals through the second communication interface 121. For this operation, the second communication interface 121 may include at least one of the Wi-Fi chip, the Bluetooth chip, or the wireless communication chip. However, this is only an example, and the second communication interface 121 may include various hardware capable of wirelessly receiving a signal such as a wireless receiving antenna.

When the plurality of driving signals are received, the IC chip 123 of the second board 120 may provide each of the received driving signals to the display module. For example, when the plurality of driving signals are received through the second communication interface 121, the IC chip 123 may provide each driving signal to each display module through the plurality of interfaces 122 electrically connected to the plurality of display modules.

Thereafter, the plurality of display modules 130 included in the display apparatus 100 may display an image of the area corresponding to the identification information of the display apparatus 100 based on the plurality of driving signals. For example, the driver IC included in each display module 130 may drive the red LED, the green LED, and the blue LED included in the display module based on the plurality of driving signals. Accordingly, each display module 130 may display the image of the area corresponding to the identification information of the display apparatus 100.

According to the display apparatus 100 according to the embodiment as described above, the first board 110 including the timing controller 112 may transmit information about an image to the display module 130 without a cable.

Accordingly, the user can easily detach the display module from the timing controller board, and can easily replace the display module with a new display module. In addition, a problem of an image error that may occur due to a defective cable may be prevented, and cleaning of the display apparatus 100 may be facilitated.

Figure 3:
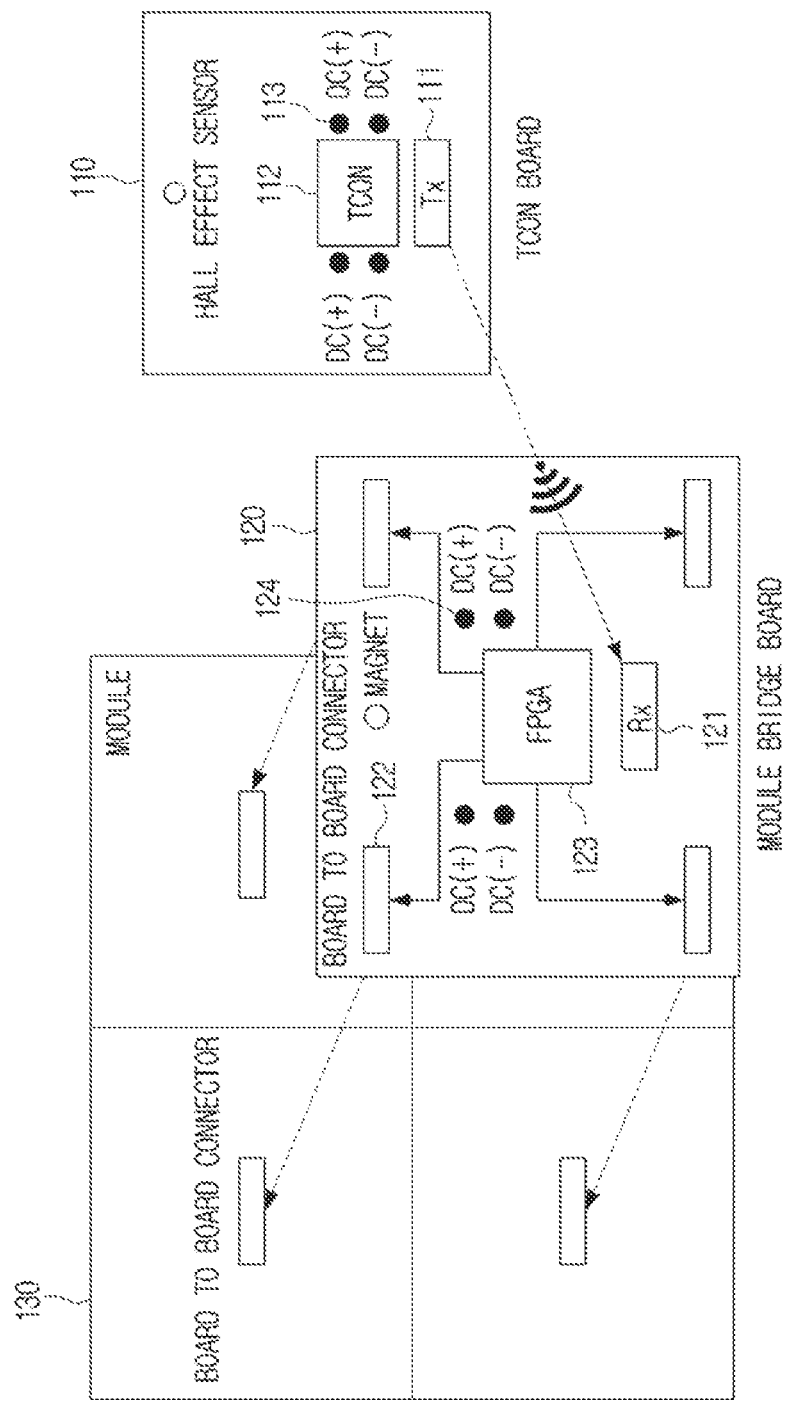
FIG. 3 is a view illustrating each composition of a display apparatus according to an embodiment.
Figure 4:
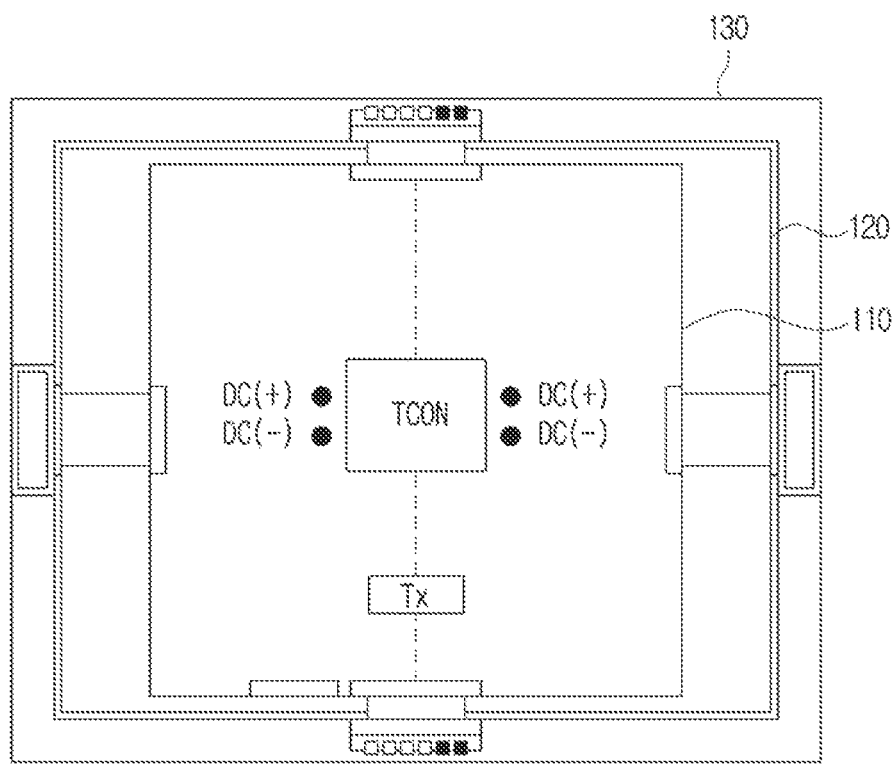
FIG. 4 is a view illustrating a structure of a display apparatus according to an embodiment.

FIGS. 3 and 4 are views illustrating a structure of a display apparatus. Hereinafter, descriptions overlapping with the above description will be described by abbreviating or omitting.

Referring to FIG. 3, the display apparatus 100 according to an embodiment of the disclosure includes a first board 110, a second board 120, and a plurality of display modules 130. When information about an image is received, the timing controller 112 of the first board 110 may generate a plurality of driving signals for driving the plurality of display modules based on the received information. In addition, the timing controller 112 of the first board 110 may transmit the generated plurality of driving signals to the second communication interface 121 of the second board 120 through the first communication interface 111.

The timing controller 112 may aggregate the plurality of driving signals into one signal and transmit the aggregated signal to the second board 120 through the first communication interface 111.

For example, the timing controller 112 may generate the plurality of driving signals for driving the red LED, the green LED, and the blue LED included in each display module based on the received information about the image, and aggregate the plurality of driving signals into an aggregated signal. For this operation, the first board 110 may further include a field programmable gate array (FPGA) designed or programmed to implement an aggregation function.

In addition, the timing controller 112 may transmit the aggregated signal to the second board 120 through the first communication interface 111.

Accordingly, the disclosure may transmit the signal for driving the plurality of LEDs to the second board 120 through one communication interface 111 without including the plurality of communication interfaces. In addition, a transmission speed of the signal may be increased.

When the aggregated signal is received through the second communication interface 121, the IC chip 123 of the second board 120 may de-aggregate the aggregated signal into a plurality of driving signals. In addition, the IC chip 123 may provide respective driving signals to each display module through the plurality of interfaces 122 electrically connected to the plurality of display modules 130. For this operation, the IC chip 123 may be an FPGA designed or programmed to implement the functions described above.

Accordingly, the second board 120 may also receive a signal for driving the plurality of LEDs through one communication interface 121 without including the plurality of communication interfaces to receive the plurality of driving signals.

Referring to FIG. 3, the first board 110 according to an embodiment of the disclosure may include a contact terminal 113 for supplying power, and the second board 120 may include a contact terminal 124 for receiving power.

The timing controller 112 may transmit power supplied from an external source to the second board 120 through the contact terminal.

For example, when the first board 110 is coupled to the second board 120 through a connecting part, the first board 110 may transmit power supplied from the outside to the second board 120 through the contact terminal included in the connecting part. The connecting part may perform coupling through a docking method.

For example, referring to FIG. 4, the first board 110 and the second board 120 according to an embodiment of the disclosure may be coupled by the docking method through the connecting part, and the second board 120 and the display module 130 may be electronically connected.

When the timing controller 112 of the first board 110 is coupled to the second board 120 through the connecting part, the timing controller 112 of the first board 110 may transmit power supplied from the external source to the second board 120 through the contact terminal included in the connecting part. Accordingly, the second board 120 may provide the plurality of driving signals to the display module by using the power supplied from the first board 110.

The power may be power supplied from an external electronic apparatus to the display device 100, as well as power supplied from another display apparatus connected through a cable.

Figure 5:
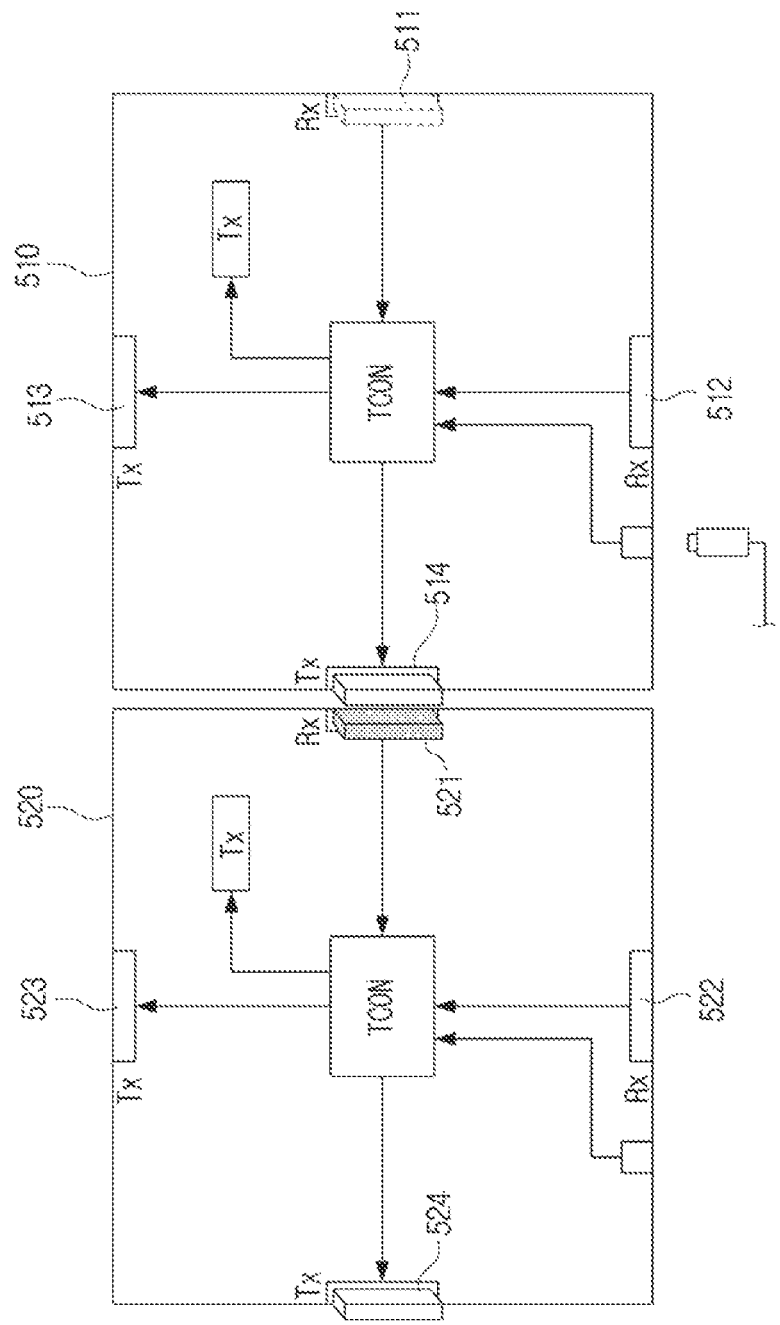
FIG. 5 is a view illustrating a method of transmitting and receiving a signal between apparatuses according to an embodiment.

FIG. 5 is a view illustrating a method of transmitting and receiving a signal between apparatuses according to an embodiment.

As described above, the display apparatus 100 may receive information about an image. The information about the image may be received from an electronic apparatus (e.g., a set top box or a control box) connected to the display apparatus 100, as well as from another display apparatus adjacent to the display apparatus 100.

For example, when information about the image is received, the display apparatus 100 may transmit the received information to another adjacent display apparatus.

For example, as illustrated in FIG. 5, when a first display apparatus 510 and a second display apparatus 520 are disposed adjacent to each other, the first display apparats 510 may transmit information about an image received by the electronic apparatus or information about an image received from another adjacent display apparatus to the second display apparatus 520.

For this operation, the display apparatus may include third communication interfaces 511, 512, 521, 522 including circuitry for wirelessly receiving information about the image from another adjacent display apparatus, and fourth communication interfaces 513, 514, 523, and 524 including circuitry for wirelessly transmitting information about the image to another adjacent display apparatus.

For example, the first display apparatus 510 may transmit information about the image received from the electronic apparatus or information about the image received from another adjacent display apparatus to the second display apparatus 520 through a third interface 514. In addition, the second display apparatus 520 may receive information about the image transmitted by the first display apparatus 510 through a fourth communication interface 521.

Similarly, when there are other adjacent display apparatuses, the second display apparatus 520 may transmit information about the image to the other adjacent display apparatuses through third communication interfaces 523 and 524.

As such, a problem of an image error that may occur due to a defective cable connected between display apparatuses may be prevented by wirelessly transmitting and receiving information about the image between display apparatuses, and may enable the display apparatus to be easily cleaned.

Figure 6:
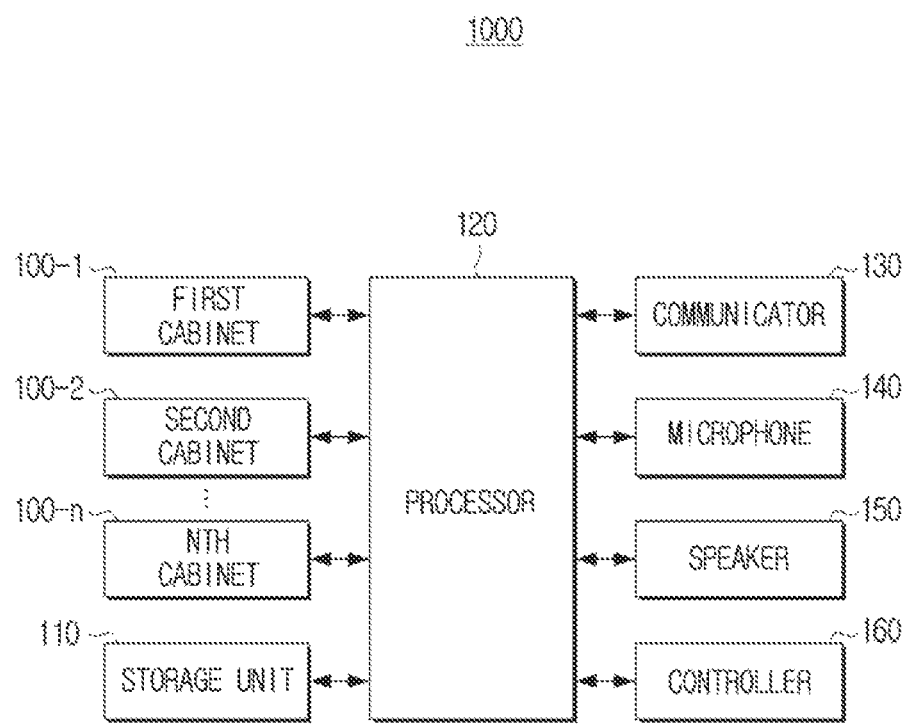
FIG. 6 is a block diagram illustrating a modular display apparatus according to an embodiment.

FIG. 6 is a block diagram illustrating a modular display apparatus according to an embodiment.

Referring to FIG. 6, a modular display apparatus 1000 according to an embodiment may include a first display apparatus 100-1, a second display apparatus 100-2, and an n-th display apparatus 100-n, a storage unit 110, a processor 120, a communicator 130, a microphone 140, a speaker 150, and a controller 160. Hereinafter, redundant descriptions provided above will be omitted or abbreviated.

The storage unit 110 may store an operating system (OS) for controlling the overall operation of components of the modular display apparatus 1000 and commands or data related to the components of the modular display apparatus 1000.

Accordingly, the processor 120 may control a plurality of hardware components or software elements of the modular display apparatus 1000 by issuing signals or commands or accessing data in the storage unit 110, load and process a command or data received from at least one of the other components in a volatile the memory, and store diverse data in a non-volatile th memory.

Meanwhile, the storage unit 110 may be implemented as various types of recording media. For example, the storage unit 110 may be implemented as a nonvolatile memory device such as a read only memory (ROM), a programmable read only memory (PROM), an erasable programmable read only memory (EPROM), a flash memory, or as a volatile memory device such as a random access memory (RAM), a hard disk, an optical disk, or the like.

The processor 120 controls overall operations of the modular display apparatus 1000.

For example, the processor 120 may control a number of hardware or software elements connected to the processor 120 by driving an operating system or application program, and perform various data processing and calculations. Further, the processor 120 may load and process a command or data received from at least one of the other components to a volatile memory and store diverse data in a non-volatile memory.

The processor 120 may be realized a dedicated processor for performing functions (e.g., embedded processor) or a generic-purpose processor for performing functions by running one or more software programs stored in a memory device (e.g., a CPU or an application processor). Further, the processor 120 may be included in the modular display apparatus 1000 or may be included in a control box connected to the modular display apparatus 1000.

The processor 120 may transmit the image received from the electronic apparatus (e.g., a set top box) to the plurality of display apparatuses in order to display the image through each of the plurality of display modules. In addition, the processor 120 may transmit identification information of each display apparatus to the plurality of display apparatuses. Accordingly, the timing controller of each display apparatus may set an ID of each display apparatus.

The communicator 130 may transmit and receive diverse data by performing communication with an external apparatus. For example, the communicator 130 may receive information about an image by communicating with an external apparatus such as a smartphone, etc., or receive a signal for controlling the modular display apparatus 1000 or a signal for controlling the external apparatus. For this, the communicator 130 may include a wireless communication chip, a Wi-Fi chip, a Bluetooth chip, and the like.

The microphone 140 may receive a user voice. The user voice may be a voice for executing a specific function of the modular display apparatus 1000.

When a user voice for executing a specific function is received through the microphone 140, the processor 120 may convert the user voice into a digital signal through a speech to text (STT) algorithm, and provide response information corresponding to the user voice. The response information may be received through an external server, or may be generated by the modular display apparatus 1000 itself.

The speaker 150 may output diverse audio signals in which various processing operations, such as decoding, amplification, and noise filtering, performed by an audio processor. In addition, the speaker 150 may output various alarm sounds or voice messages.

A controller 160 may be implemented by a touch screen, a touch pad, a key button, or the like.

The modular display apparatus 1000 may further include a USB port to which a USB connector is connected, various external input ports for connecting various external terminals such as a headset, mouse, and LAN, and a digital multimedia broadcasting (DMB) chip that receives and processes a DMB signal.

In addition, the modular display apparatus 1000 may include a broadcast receiver that receives a broadcast signal from a broadcasting station or satellite in a wired or wireless manner, a signal separator tuner, and/or demultiplexer for separating the broadcast signal received from the broadcast receiver into a video signal, an audio signal, and an additional information signal, an audio/video processor for performing video decoding and video scaling on the video signal, and performing audio decoding on the audio signal, or the like.

Figure 7:
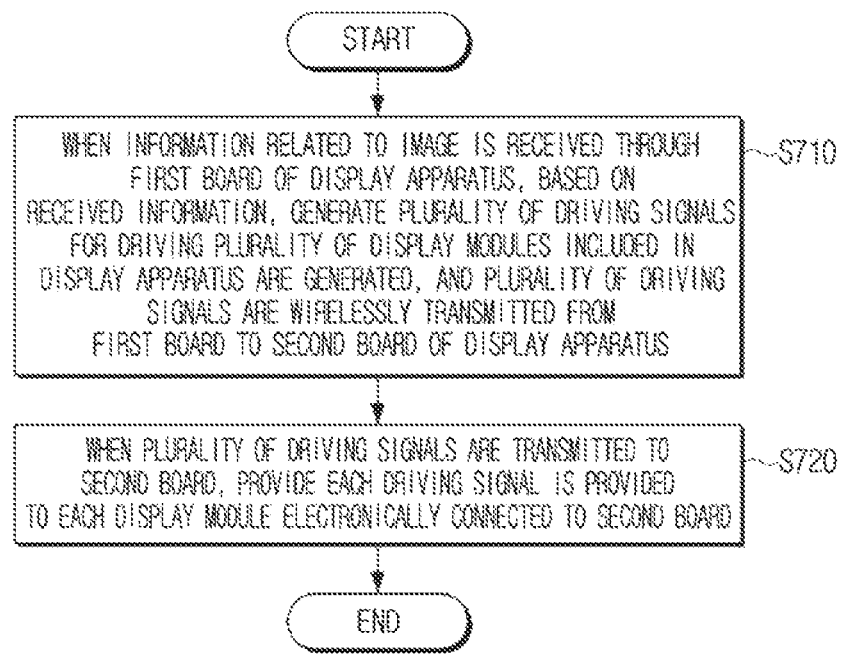
FIG. 7 is a flowchart illustrating a method of controlling a display apparatus according to an embodiment.

FIG. 7 is a flowchart illustrating a control method of a display apparatus according to an embodiment.

In the disclosure, when information about an image is received through a first board of a display apparatus, a plurality of driving signals for driving a plurality of display modules included in the display apparatus are generated based on the received information, and the plurality of driving signals may be wirelessly transmitted from the first board to a second board of the display apparatus (S710).

For example, the display apparatus may transmit the plurality of driving signals to the second board through a plurality of wireless communication interfaces and aggregate the plurality of driving signals into one signal, and may transmit the aggregated signal to the second board through one wireless communication interface.

When the plurality of driving signals are transmitted to the second board, each driving signal may be provided to each display module electrically connected to the second board (S720).

In particular, when the aggregated signal is received, the second board may de-aggregate the aggregated signal into a plurality of driving signals and transmit the plurality of driving signals to a driver IC of each display module.

Accordingly, the plurality of display apparatuses included in the modular display apparatus 1000 may display images corresponding to each display apparatus.

According to various embodiments of the disclosure as described above, a modular display apparatus without an electrical connection between the timing controller board and the display module may be provided.

Accordingly, the user may easily detach the display module from the timing controller board, and may easily replace the display module with a new display module. In addition, a problem of an image error that may occur due to a defective cable may be prevented, and the display apparatus may be easily cleaned.

A non-transitory computer readable medium storing a program sequentially performing a controlling method according to the disclosure may be provided.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although the preferred exemplary embodiments of the disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the disclosure.

What is claimed is:

1. A display apparatus among a plurality of display apparatuses constituting a wall display, the display apparatus comprising:
    a first display module;
    a second display module;
    a first communication interface configured to be connected with an external apparatus via a cable;
    a second communication interface configured to be connected wirelessly with another display apparatus among the plurality of display apparatuses; and
    one or more processors configured to:
        receive image information from the external apparatus through the first communication interface;
        based on the received image information, generate a first driving signal for the first display module and a second driving signal for the second display module;
        based on the generated first driving signal, control the first display module to display a first portion of the image information, and based on the generated second driving signal, control the second display module to display a second portion of the image information; and
        control the second communication interface to provide the image information to the another display apparatus including a third display module and a fourth display module, to cause the third display module to display a third portion of the image information and cause the fourth display module to display a fourth portion of the image information.

2. The display apparatus of claim 1, wherein the one or more processors are further configured to:
identify an area of the image information corresponding to identification information of the display apparatus, and
generate the first driving signal and the second driving signal based on the identified area of the image information.

3. The display apparatus of claim 1, further comprising:
a first contact terminal; and
a second contact terminal configured to provide power received through the first contact terminal to the another display apparatus.

4. The display apparatus of claim 1, wherein the first communication interface is provided at a first side of the display apparatus, and
the second communication interface is provided at a second side of the display apparatus, the second side being adjacent to the another display apparatus and opposite to the first side of the display apparatus.

5. The display apparatus of claim 1, wherein the another display apparatus is coupled adjacent to the display apparatus.

6. The display apparatus of claim 1, further comprising:
at least one connecting part configured to couple to the another display apparatus.

7. A display apparatus for a display wall, the display apparatus comprising:
one or more display modules;
a first communication interface including circuitry configured to perform wired communication;
a second communication interface including circuitry configured to perform wireless communication;
a processor configured to:
receive image information from an external apparatus through the first communication interface;
generate one or more driving signals to control the one or more display modules;
based on the generated one or more driving signals, control the one or more display modules to display a first portion of the image information; and
control the second communication interface to provide the image information to another display apparatus to cause the another display apparatus to display a second portion of the image information.

8. The display apparatus of claim 7, wherein the processor is further configured to:
identify a portion of an image in the image information to be displayed by the display apparatus, and
generate the one or more driving signals based on the identified portion of the image.

9. The display apparatus as claimed in claim 7, further comprising:
a first terminal configured to receive power for operating the display apparatus; and
a second terminal configured to supply the received power to the another display apparatus.

10. The display apparatus of claim 7, wherein the second communication interface is provided on a side of the display apparatus adjacent to the another display apparatus.

* * * * *